United States Patent Office 3,129,057
Patented Apr. 14, 1964

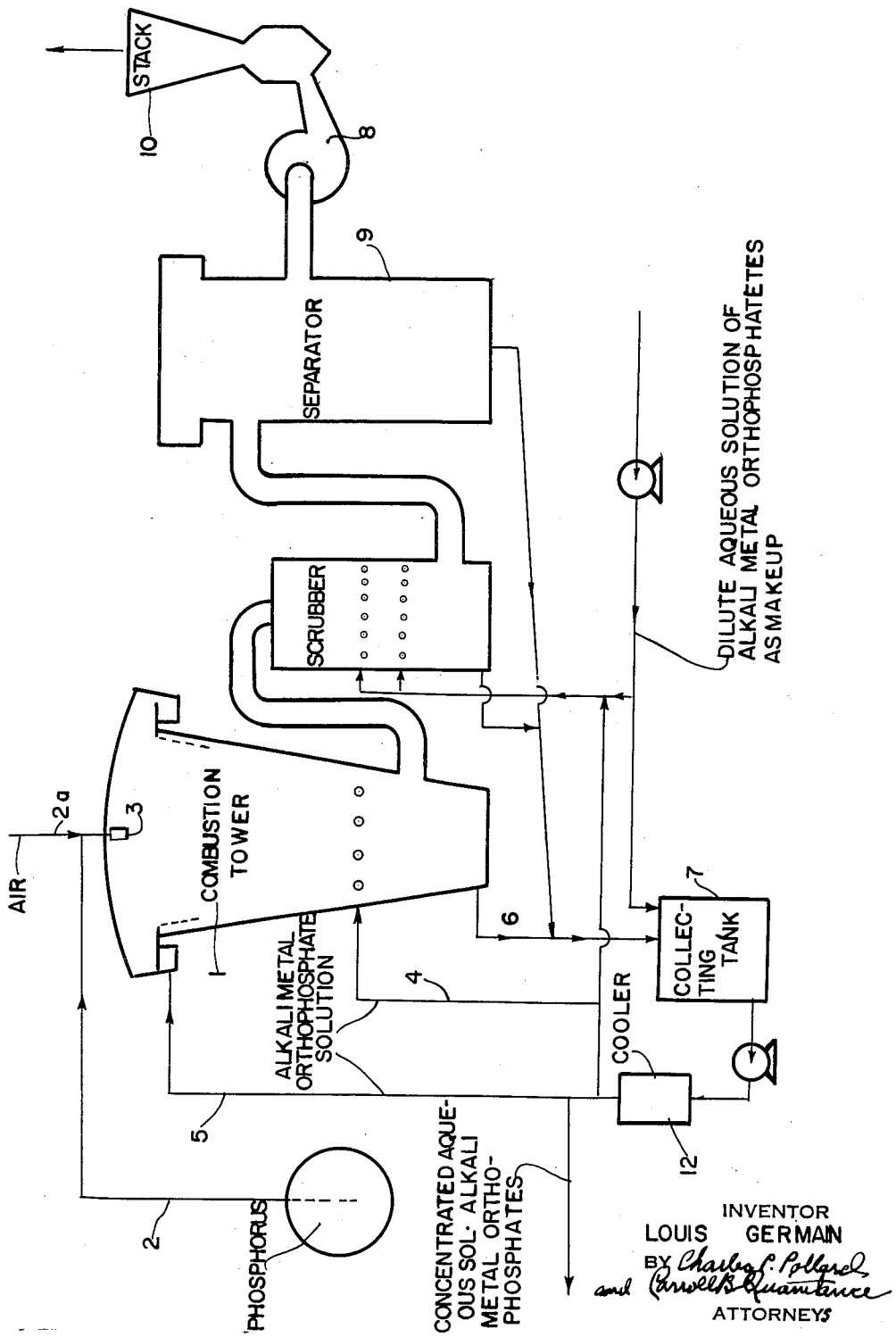

3,129,057
PROCESS FOR THE PRODUCTION OF STRONG SOLUTIONS OF ALKALI METAL SALTS OF INCREASED PURITY
Louis Germain, Tassin, France, assignor to Progil, S.A., Rhone, France, a corporation of France
Filed Oct. 28, 1960, Ser. No. 65,691
7 Claims. (Cl. 23—107)

This invention relates to a process for the production of strong solutions of alkali metal phosphates of increased purity.

Logically it would seem that the solutions obtained by the acid treatment of the naturally occurring phosphates, such as calcium phosphate or the like, constitute the most economically feasible source of commercial alkali metal phosphates. As is known, such alkali metal phosphates typically are produced commercially from natural phosphates by a so-called "wet process" wherein the phosphate rock, such as calcium phosphate, is first decomposed with sulfuric acid and then treated in an aqueous medium with an alkali metal carbonate, or a hydroxide, until all alkaline earth ions precipitate as phosphates and aqueous solutions of alkali metal phosphates are formed. Thereafter the precipitated alkaline earth phosphate is separated by filtration to give a relatively dilute solution of alkali metal orthophosphate. This filtrate must be concentrated in order to produce alkali metal orthophosphates of sufficient concentration for most commercial usage. In particular, the filtrate must be concentrated in order for it to be used directly for the production of the most widely demanded types of commercial alkali metal phosphates, namely alkali metal salts of molecularly dehydrated phosphoric acids (particularly sodium tripolyphosphate $Na_5P_3O_{10}$).

Experience has taught, however, that the production of alkali metal phosphates from natural phosphates, by the wet process, does not have the economic advantages one would expect. For example, filtrates such as mentioned above still contain important quantities of impurities, especially in the form of alkali metal sulfates, and the concentrated filtrate necessary for the production of alkali metal salts of molecularly dehydrated phosphoric acids contains too high a ratio of $SO_4/P_2O_5$ radicals to be commercially acceptable. Thus a special purification process is necessary to reduce the $SO_4/P_2O_5$ ratio to an acceptably low value. Unfortunately this purification process constitutes an economic burden on the process and results in a dissipation of phosphorus values. Also the necessary separation of iron by precipitation leads to solutions which are too alkaline to permit the manufacture of all the phosphate species in particular the sodium tripolyphosphate $(Na_5P_3O_{10})$ and the sodium metaphosphate $(NaPO_3)_n$. The foregoing treatments constitute important economic burdens upon processes for the production of alkali metal phosphates from phosphates derived from natural phosphates by the so-called "wet process."

It is a general object of this invention to provide a process which will permit one to take advantage of the availability of "wet process" solutions as an inexpensive raw material for the production of alkali metal phosphates without being penalized by the economic disadvantages of the processes heretofore used. It is another objective of the invention to convert impure and relatively dilute alkali metal phosphate solutions, as derived from natural phosphates by the so-called "wet process," directly into more concentrated alkali metal phosphate solutions having decreased impurity to $P_2O_5$ and suitable $Na_2O/P_2O_5$ ratios which are well adapted to the production of ortho, meta, pyro and polyphosphates of commercially acceptable purity without utilizing the expensive and inefficient concentration and purification steps heretofore considered necessary. It is a more particular objective of my invention to obtain alkali metal polyphosphates of acceptable commercial purity, such as sodium tripolyphosphate, directly and primarily from dilute aqueous solutions of alkali metal orthophosphates obtained from natural phosphates, such as calcium phosphates or pseudowavelite (Senegal phosphates), by the "wet process." It is a special object of the invention to obtain alkali metal phosphates of acceptable commercial purity directly from the dilute aqueous solution of alkali metal phosphates obtained by the "wet process" from by-product phosphates obtained after the extraction of aluminum from aluminum bearing phosphates such as the above noted pseudowavelite.

Now it has surprisingly been found that such impure dilute aqueous alkali metal phosphate solutions, such as derived from natural phosphates by the "wet process," can be concentrated and the impurity to phosphate ratio reduced so that these solutions can be used directly in a commercially feasible process for the production of alkali metal phosphates of acceptable purity by bringing these dilute solutions into contact with $P_2O_5$ thermally produced from phosphorus by a so-called "thermal process." More especially, it has been found that the process of this invention permits the increasing of the phosphorus to alkali ratio, the decreasing of the impurity to phosphate ratio, and the decreasing of concentration of such dilute and impure solutions such that they may be used directly as an economically feasible source of alkali metal polyphosphates of acceptable purity such as sodium tripolyphosphate and polymeric sodium metaphosphate.

The manner in which the thermally produced $P_2O_5$ and the dilute aqueous solution hereof are brought into contact with one another is broadly known. Basically, it is known the phosphorus may be burned in a reactor to produce $P_2O_5$ with an important evolution of heat and that the $P_2O_5$ can be absorbed in aqueous media introduced into the reactor to form phosphoric acid with a further evolution of heat. This phosphoric acid, in turn, may react with ingredients in the solution with a further evolution of heat when the reaction is exothermic. Processes have been developed whereby thermally produced $P_2O_5$ has been absorbed in aqueous media containing ingredients which exothermically react with the absorbed $P_2O_5$ wherein the burning of the phosphorus in the reactor and the flow of the absorbing aqueous solution therethrough are correlated so that the amount of water evaporated maintains a temperature in the reactor which permits the utilization of economically feasible reactor materials. Since the temperature in the reactor of the prior art processes is determined partly by the temperature of the aqueous media introduced into the reactor but primarily by the cooling effect of the water evaporated in the reactor, it is possible to maintain appropriate temperatures in the reactors of this invention by regulating the flow of impure alkali metal orthophosphate solutions hereof in a like manner.

For the reasons given in the above paragraph, the manner in which the thermally produced $P_2O_5$ and the dilute aqueous solutions of impure alkali metal orthophosphates are brought into contact with one another is illustrated in a flow sheet with apparatus elements shown somewhat diagrammatically. In the flow sheet, 1 is a vertical tower in which phosphorus from conduit 2 and air from conduit 2a are introduced into one or more burners 3. The tower and the burners are of the type already known for the burning of phosphorus to $P_2O_5$ and its absorption in an aqueous media. One should be careful, however, to introduce sufficient air to completely burn the phosphorus to $P_2O_5$. An aqueous orthophosphoric solution obtained from natural phosphates by the "wet process" is introduced into tower 1 through two conduits 4 and 5. The alkali metal phosphate introduced through conduit 4 is sprayed or atomized into the tower 1 in the form of a very finely divided spray or mist. The alkali metal orthophosphate solution introduced through conduit 5 is introduced into a weir or cap located at or near the top of tower 1 which forms a reservoir from which the aqueous orthophosphate flows down along the sides of the tower in the form of a continuous film or curtain of orthophosphate solution.

The very pure $P_2O_5$ formed in the tower is absorbed in the alkali metal orthophosphate solutions introduced into the tower to form alkali metal phosphate solutions with a higher content of phosphorus relative to the content of impurities and alkali metal. At the same time the heat generated by the combustion of the phosphorus and by the absorption and reaction of the $P_2O_5$ causes water in the orthophosphate to be vaporized thereby producing a relatively concentrated solution of alkali metal orthophosphate solution of decreased impurity to phosphorus ratio.

The presence of an aqueous mist distributed regularly throughout the cross-section of the tower is very important. The solution flowing along the walls plays only a secondary part as a dissolving medium but it does preclude the escaping of the gases containing $P_2O_5$ along the walls. The aqueous mist must constitute very small droplets and, as shown, the water and the alkali metal used in the process are derived entirely from the dilute aqueous solution of the alkali metal phosphate as obtained in the "wet process." Furthermore the proportions of diluted solution and of $P_2O_5$ are determined with precision, the objective being to obtain the ratios of $Na_2O/P_2O_5$ suitable for the production of the desired type of alkali metal phosphate and particularly those of a polymeric or molecularly dehydrated nature.

All of the foregoing factors contribute importantly to the economically feasible conversion of the impure alkali metal orthophosphate solutions derived by the "wet process" from natural phosphates into solutions suitable for the production of commercially acceptable alkali metal salts of molecularly dehydrated phosphoric acids.

The liquids are collected at the bottom of tower 1 and carried to collecting tank 7 through conduit 6 from whence they are partly recycled and partly withdrawn as the net production of the system. The recycling can be regulated so that the withdrawn orthophosphate solutions are suitable for the purposes set out above. As shown, the dilute alkali phosphate solution to be concentrated can either be used directly to feed into the system or it may be introduced partially or wholly into the collection tank 7.

The gas stream passing through the unit is controlled in a known manner by a venting blower 8 in order that a desired concentration of alkali metal orthophosphate may be obtained and a desired temperature may be maintained. Normally the blower imparts a mild vacuum to the system.

The gases flowing from tower 1 pass through a scrubber where residual $P_2O_5$ is absorbed. In the event that any $P_2O_5$ still remains in the gas, it can be removed in a conventional and known manner in a separator 9 as, for instance, by use of an electrostatic precipitator, a venturi cyclone system, a stonewear filter or the like. The resulting gas which is normally free of phosphorus pentoxide and the phosphoric acid and is saturated with water vapor is then vented into the atmosphere from separator 9 through stack 10.

As an additional control, the alkali metal orthophosphate solution which is recycled from the collection tank 7 may be passed through a cooler 12 which will facilitate a control on the amount of water evaporated in the tower. Generally speaking, the heat generated by the burning of the phosphorus and the absorption of phosphorus pentoxide in the aqueous solution of alkali metal orthophosphate and its reaction therein can be controlled in the manner aforementioned so that the temperature in the reactor does not exceed 100° C., thereby permitting the use of inexpensive reactors.

It will be understood that the alkali metal orthophosphate solution may be recycled until the desired concentration and $P_2O_5$ content is obtained and that introduction of the make-up solution of impure dilute alkali metal orthophosphate can be appropriately correlated with the net production of the system.

The net yield of the system may be used to produce commercial phosphates of acceptable purity by known processes without further purification or additional concentration of the solution.

The following purely illustrative examples will serve further to facilitate an understanding of the invention and its significance.

*Example 1*

One hundred kg. (100 kg.) of phosphorus per hour were burned in a reactor, such as shown in the flow sheet, in the presence of a convenient excess of oxygen which ensured complete combustion. 6,450 kg. of a disodium monohydrogen phosphate solution, obtained by the "wet process" and containing 18% of $P_2O_5$ by weight, were introduced per hour into the apparatus in the manner explained. There was obtained a solution containing 25% of $P_2O_5$ by weight and with a ratio of Na/P such that the solution could be used directly for the production of sodium tripolyphosphate $Na_5P_3O_{10}$.

The disodium hydrogen phosphate solution introduced into the reactor contained 1.4% by weight of sulfuric ions, as $Na_2SO_4$, and 18% by weight of $P_2O_5$. This solution was not capable of being converted into a sodium tripolyphosphate end-product containing more than 55.5% of $P_2O_5$ by weight. This amount was not sufficient to meet industrial requirements of 56% of $P_2O_5$ by weight. The amount of $P_2O_5$ content obtained with the same starting disodium hydrogen phosphate by following this example was 56.3% of $P_2O_5$ by weight and the sulfuric ions were present in a commercially acceptable concentration.

*Example 2*

One hundred kg. (100 kg.) of phosphorus per hour were burned in the manner disclosed in the flow sheet in the presence of a convenient excess of oxygen which ensured complete combustion. 1,270 kg. of a disodium hydrogen phosphate solution, obtained by the "wet process" and containing 18% of $P_2O_5$ by weight were introduced into the apparatus per hours. A monosodium dihydrogen phosphate solution containing 42% of $P_2O_5$ by weight was obtained which gave by cooling and centrifuging at 60° C. crystals of anhydrous monosodium dihydrogen phosphate.

The mother-liquors could be recycled favorably for a longer period of time than when using the usual process for the proportion of impurities herein are notably lower.

*Example 3*

In the manner of Examples 1 and 2, 100 kg. of phosphorus were burned per hour in the presence of a convenient excess of oxygen which ensured complete combustion. 3,700 kg. of crystalline trisodiumphosphate $Na_3PO_4 \cdot 12 H_2O$ dissolved in its water of crystallization were added per hour. A concentrated solution was obtained with a ratio Na/P such that it could be used directly for the production of sodium tripolyphosphate.

The final amount of impurities in the sodium tripolyphosphate was lowered as explained in Example 1.

Other alkali metal phosphates such as potassium and ammonium phosphates can be used instead of the sodium phosphates in the preceding examples and analogous results obtained.

It will be seen from the foregoing description and examples, that it is possible to produce commercially acceptable alkali metal phosphates, including alkali metal salts of molecularly dehydrated phosphoric acid, directly from the relatively dilute and impure aqueous solutions of alkali metal orthophosphates derived from natural phosphates by the "wet process" without utilizing concentrating and purification techniques heretofore considered necessary so that the major proportion of the $P_2O_5$ comes from such solutions and all of the alkali metal and water used in the process comes therefrom.

It will be understood the illustrative embodiments of this invention set out herein do not constitute a limitation upon the invention for those skilled in the production of phosphates can make various modifications in the details of these illustrative embodiments in the light of the instant teachings without departing from the spirit and scope of the invention as set out above and defined in the appended claims.

I claim:

1. A method for obtaining more concentrated aqueous solutions of alkali metal salts of phosphoric acid from a starting dilute aqueous solution of an alkali metal orthophosphate derived from natural phosphates by the so-called "wet process" wherein, in comparison to the initial solution, the phosphorus to alkali metal ratio is increased and the impurity to phosphorus ratio is decreased, which comprises burning phosphorus in an atmosphere containing oxygen to gaseous $P_2O_5$ and flowing the resulting combustion gases containing $P_2O_5$ into contact with finely divided droplets of said starting solution in stoichiometric proportions of $P_2O_5$ and alkali metal orthophosphate to form an aqueous solution of an alkali metal phosphate having reduced alkalinity and a decreased impurity to phosphorus ratio, and said formed solution having at least the $P_2O_5$ to alkali metal ratio of alkali metal pyrophosphate.

2. A method for obtaining concentrated aqueous solutions of alkali metal salts of phosphoric acid from a dilute starting aqueous solution of an alkali metal orthophosphate derived from natural phosphates by the so-called "wet process" wherein, in comparison to the initial solution, the phosphorus to alkali metal ratio is increased and the impurity to phosphorus ratio is decreased to a ratio complying with a desired standard for commercial grade phosphate, which method comprises continuously burning phosphorus in an atmosphere containing oxygen in a reaction zone to gaseous $P_2O_5$ and continuously flowing the resulting combustion gases containing the $P_2O_5$ into contact with a continuously recycling stream of said orthophosphate dispersed in the form of finely divided aqueous droplets to thereby form a more concentrated aqueous solution of an alkali metal phosphate having a desired increased phosphorus to metal ratio of at least the alkali to $P_2O_5$ ratio of an alkali metal pyrophosphate.

3. A method for obtaining concentrated aqueous solutions of alkali metal salts of phosphoric acid from an initial dilute aqueous solution of an alkali metal orthophosphate derived from natural phosphates by the so-called "wet process" wherein, in comparison to the initial solution, the phosphorus to alkali metal ratio is increased to at least the ratio of phosphorus to alkali metal found in alkali metal pyrophosphate and the impurity to phosphorus ratio is decreased, which method comprises continuously burning phosphorus in a reactor in an atmosphere containing oxygen to $P_2O_5$ and continuously flowing the resulting gaseous $P_2O_5$ into contact with a continuously recycling stream of said orthophosphate flowing through the reactor to thereby form a more concentrated aqueous solution of alkali metal phosphate.

4. The process of claim 3 wherein part of the recycling solution is flowed along the walls of the reactor and part thereof is sprayed into the reactor.

5. A process for obtaining more concentrated aqueous solutions of alkali metal salts of phosphoric acid from a dilute initial aqueous solution of an alkali metal orthophosphate derived from natural phosphates by the "wet process" extraction of rock phosphate and reaction of said extract with an alkali, the said more concentrated aqueous solutions being directly useful for the preparation of alkali metal phosphates, such as metaphosphates, pyrophosphates and polyphosphates, which process comprises burning phosphorus in an atmosphere containing oxygen and intimately contacting the $P_2O_5$ combustion gases with a mist of fine droplets of the said orthophosphate aqueous solution in respective quantities such that the resulting aqueous solution has a phosphorus to alkali metal ratio of at least the phosphorus to alkali metal ratio of alkali metal pyrophosphate and a lower impurity to phosphorus ratio than the initial solution.

6. A method for obtaining a solution suitable for the production of sodium tripolyphosphate from an aqueous solution of sodium orthophosphates derived from natural phosphates by a sulfuric acid wet process extraction of the natural phosphates and reaction of the extract with sodium hydroxide, which method comprises continuously burning phosphorus in an atmosphere containing oxygen in a reaction zone to gaseous $P_2O_5$ and continuously recycling said aqueous sodium orthophosphate solution in contact with said $P_2O_5$ to form a more concentrated solution until the $P_2O_5$ content of the alkali phosphate is increased to the ratio of $Na_2O$ to $P_2O_5$ contained in sodium tripolyphosphate.

7. A method for obtaining a solution suitable for the production of sodium metaphosphate from aqueous solution of sodium orthophosphates derived from natural phosphates by sulfuric acid wet process extraction of the natural phosphates and reaction of the extract with sodium hydroxide, which method comprises continuously burning phosphorus in an atmosphere containing oxygen in a reaction zone to gaseous $P_2O_5$ and continuously recycling said aqueous sodium orthophosphate solution in contact with said $P_2O_5$ to form a more concentrated solution and until the $P_2O_5$ content of the alkali phosphate is increased to the ratio of $Na_2O$ to $P_2O_5$ contained in sodium metaphosphate.

References Cited in the file of this patent

UNITED STATES PATENTS

| | | |
|---|---|---|
| 2,266,328 | McCullough | Dec. 16, 1941 |
| 2,280,848 | Pole | Apr. 28, 1942 |
| 2,792,284 | Alexander | May 14, 1957 |
| 2,792,285 | Alexander | May 14, 1957 |